May 20, 1952 — A. T. STRATTON — 2,597,134
CIRCUIT INTERRUPTER
Original Filed Aug. 26, 1943 — 2 SHEETS—SHEET 1
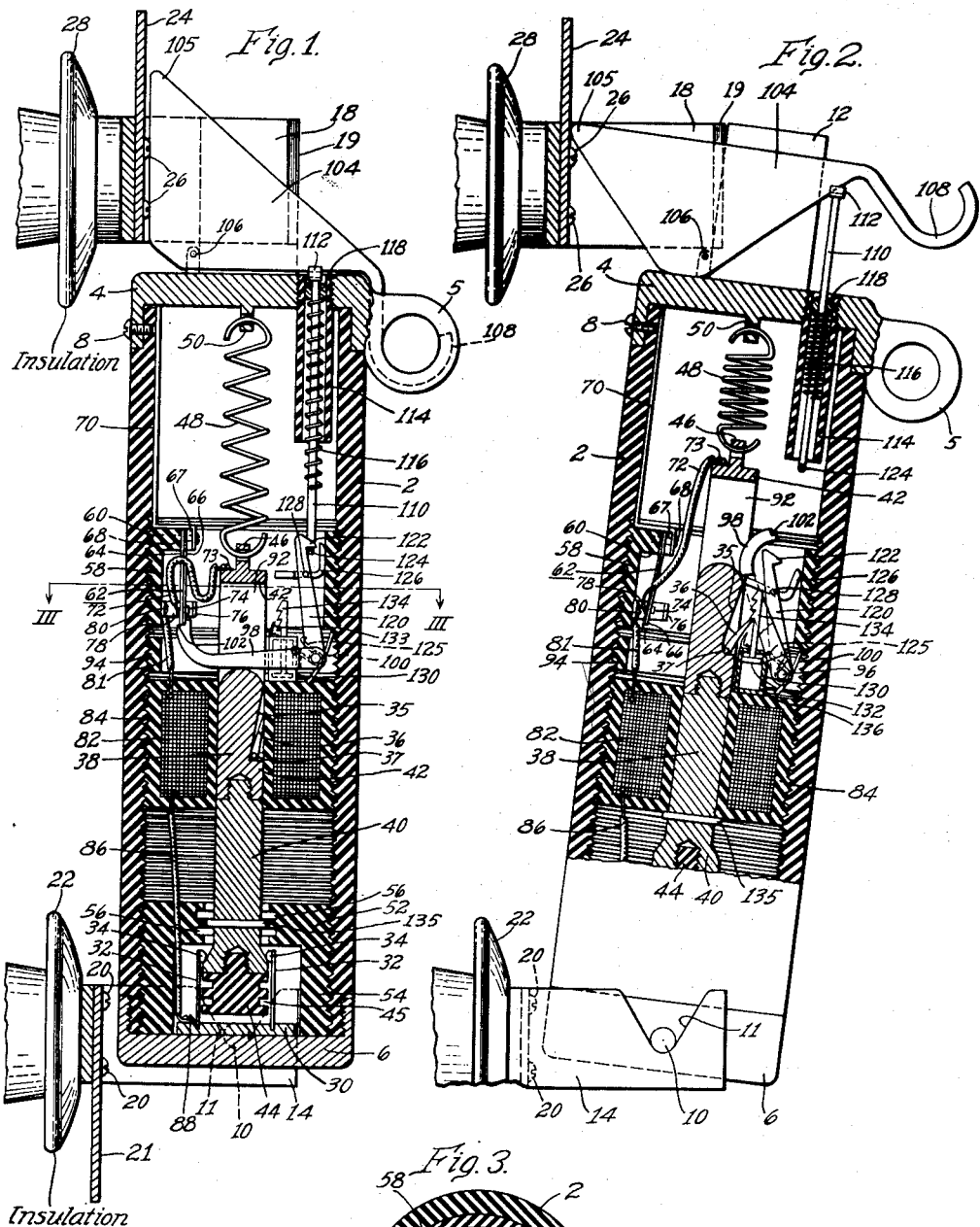
WITNESSES:
INVENTOR
Arthur T. Stratton.
BY
ATTORNEY May 20, 1952  A. T. STRATTON  2,597,134
CIRCUIT INTERRUPTER
Original Filed Aug. 26, 1943  2 SHEETS—SHEET 2
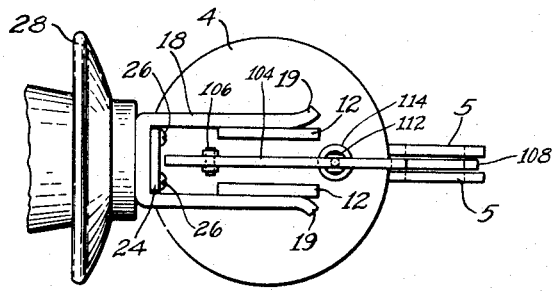
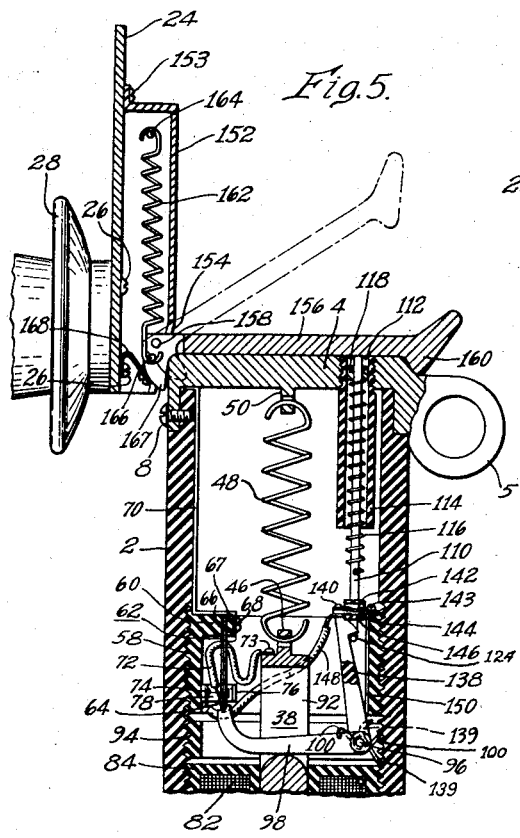
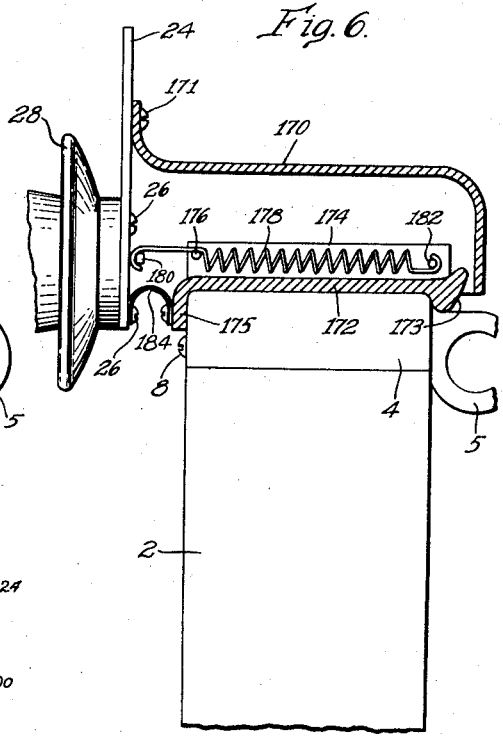
WITNESSES:
INVENTOR
Arthur T. Stratton.
BY
ATTORNEY Patented May 20, 1952

2,597,134

UNITED STATES PATENT OFFICE 2,597,134

CIRCUIT INTERRUPTER

Arthur T. Stratton, Wilkinsburg, Pa., assignor to Westinghouse Electric Corporation, East Pittsburgh, Pa., a corporation of Pennsylvania Substituted for abandoned application Serial No. 500,036, August 26, 1943. This application May 15, 1946, Serial No. 669,806

13 Claims. (Cl. 200—89)

This invention was originally disclosed in my application Serial No. 500,036 filed August 26, 1943 for Circuit Interrupters, assigned to the same assignee as this invention, and this application constitutes a continuation of the aforesaid application Serial No. 500,036.

This invention relates generally to electric circuit interrupters, especially to such interrupters which are capable of automatically dropping out of the circuit in response to a circuit interrupting operation, and in one specific instance to an interrupter capable of automatically reclosing the circuit a predetermined number of times after which the interrupter remains open and drops out of the circuit.

So-called "repeating fuses" are used in many instances for the protection of electric circuits, and these fuses usually comprise an assembly of a plurality of fuses which are automatically successively inserted in the circuit in response to fault currents above a predetermined value, to interrupt and reclose the circuit a number of times depending upon the number of fuses in the assembly, and upon continuance of any one fault the fuses will all blow leaving an open circuit with a visible air gap.

Small automatic reclosing circuit breakers have been developed for many of the same uses as "repeating fuses." These circuit breakers are capable of automatically opening the circuit a predetermined number of times in response to continuing faults, after which the breaker contacts are maintained open. One such reclosing circuit breaker is disclosed in H. L. Rawlins et al. Patent No. 2,303,953, Circuit Interrupter, issued December 1, 1942, to the same assignee of this invention. Such a circuit breaker has the advantage of being automatically resettable on self-clearing faults so that no attention is required unless they become locked open on sustained faults. These circuit breakers, however, lack the ability to insert a visible air gap in the circuit which is desirable for disconnecting and safety purposes, and which "repeating fuses" employing a plurality of drop-out fuse cutouts are capable of doing.

Accordingly, one object of this invention is to provide a circuit breaker of the type described which is automatically operable to insert a relatively large visible air gap in the circuit in response to a predetermined number of closely successive circuit interrupting operations by the breaker.

More specifically, it is an object of this invention to provide an automatic reclosing circuit breaker normally held in engagement with at least one circuit terminal, with provisions for causing movement of the breaker out of engagement with said one terminal in response to a predetermined number of successive circuit interrupting operations by the breaker.

Another object of this invention is to provide improved means for releasing a circuit interrupter from at least one line terminal of the circuit in which the interrupter is placed, in response to a circuit interrupting operation by the interrupter.

Another object of this invention is to provide means for holding a circuit interrupter in engagement with circuit terminals, which means is also operable to release and move the interrupter in a direction away from at least one circuit terminal in response to a circuit interrupting operation by the interrupter.

Still another object of this invention is to provide an improved line contact latch construction.

These and other objects of this invention will become more apparent upon consideration of the following description of preferred embodiments thereof, when taken in connection with the attached drawings, in which:

Figure 1 is a longitudinal sectional view of a circuit breaker and mounting therefor constructed in accordance with this invention;

Fig. 2 is a view similar to Fig. 1, but illustrating the parts in another position;

Fig. 3 is a transverse section of the circuit breaker shown in Figs. 1 and 2, taken substantially on the line III—III of Fig. 1;

Fig. 4 is a top plan view of the circuit breaker in the position shown in Fig. 1;

Fig. 5 is a partial longitudinal section of a modified form of circuit breaker and one line contact, and Fig. 6 is a side elevation of the upper end of a circuit breaker constructed in accordance with this invention illustrating another modified form of line contact structure.

The specific circuit breaker shown on the drawings is much like that shown in the Rawlins et al. patent mentioned above, and comprises a substantially cylindrical insulating casing 2, which may be of any desired insulating material, such, for example, as fiber, porcelain or glass. The casing 2 is provided with end terminal caps 4 and 6 for closing opposite ends of the casing and forming terminals for the interrupter. Terminal cap 4 is provided with an integral peripheral flange adapted to telescope over the reduced end of casing 2 and be secured thereto, for example, as by screws 8. Terminal cap 4 is also provided with an integral hook eye extension 5 for the reception of a hook stick or other operating member.

The terminal cap 6 at the opposite end of casing 2 is provided with an interiorly threaded flange adapted to engage with the outer surface of the adjacent reduced outer end of the casing 2. Terminal cap 6 is provided at opposite sides thereof with trunnions 10 adapted to be received in bearing notches 11 provided in the side arms of a substantially U-shaped hinge contact 14. Hinge contact 14 is adapted to be mounted on an insulator 22, for example, as by screws 20 passing through apertures in the bight portion of the hinged contact and threaded into the end cap of insulator 22. A terminal pad 21 may also be secured in engagement with the bight portion of contact 14 by screws 20, so as to extend downwardly for connection with a line conductor. Terminal cap 4 is provided with a pair of spaced upwardly extending terminal tongues 12 adapted to be received between the sides of a U-shaped break contact 18, in frictional engagement therewith. Break contact 18 may be secured to a second insulator 28 by screws 26 which also secure a terminal pad 24 in operative position in substantially the same manner as hinge contact 14 is secured to insulator 22.

The structure thus far described comprises a disconnecting type of circuit interrupter operable similarly to a disconnecting switch, so that the circuit may be interrupted to provide a relatively large air gap in the circuit by merely exerting a pull on the hook eye 5, when the parts are positioned as shown in Fig. 1, to rotate the interrupter about trunnions 10 for movement of break terminal tongues 12 out of engagement with break contact 18. After such a circuit opening operation, the circuit may be reclosed by exerting a force on the hook eye 5 in the opposite direction to rotate the interrupter about trunnions 10 in a counterclockwise direction. It will be observed that the sides of break contact 18 are flared outwardly as at 19, to facilitate entrance of terminal tongues 12.

On the inner surface of terminal cap 6 there is secured a supporting plate 30, such, for example, as by welding or the like, which has its inner surface notched to receive a plurality of resilient contact supporting strips 32, the inner ends of which are received in the notches in plate 30, and secured therein, for example, as by soldering or welding. Each contact strip 32 is provided at its outer end with a laterally projecting contact button 34 which may be integral therewith, or rigidly attached thereto.

A slidably mounted contact rod 38 is provided to cooperate with contact buttons 34, and, as shown, is substantially centrally mounted in casing 2, and is slidable substantially longitudinally of the casing. Contact rod 38 is made up of three sections, with one end section 42 being of a conducting magnetic material, such, for example, as iron or the like. Section 42 of the contact rod has an interiorly threaded socket at its lower end for receiving a reduced threaded projection on the intermediate rod section 40 which should be of a conducting material which is substantially nonmagnetic, such, for example, as copper or brass. In the same manner, an outer insulating section 44 is secured to the opposite end of intermediate section 40 and is provided with spaced peripheral grooves 45. The outer end of magnetic section 42 is provided with an integral apertured projection 46 through which is hooked one end of a coil tension spring 48, with the other end of the spring anchored to an eyelet 50 integral with the inner surface of terminal cap 4. Section 42 is also provided with a cavity 35 in one side thereof for receiving a pawl lever 36 pivoted at its lower end as at 37, for a purpose to be described.

On the side of the fixed contact buttons 34 towards movable contact rod 38 there is provided a centrally apertured baffle member 52 of insulating material, preferably an insulating material which is capable of evolving an arc extinguishing gas when in proximity to an electric arc, such, for example, as fiber or a synthetic resin. Baffle 52 is provided with a laterally extending integral sleeve portion 54, the outer surface of which is threaded to engage the interior threads provided on the inner surface of casing 2. The central aperture through baffle 52 is provided with spaced annular grooves 56.

The closed circuit position of the contacts is shown in Fig. 1, and it will be observed that when the contact rod 38 moves upwardly to open the circuit an arc will be drawn between contact buttons 34 and the lower end of conducting section 40 of the contact rod. This arc will be confined as the contact rod moves upwardly between closely spaced walls of insulating material defining the exterior surface of rod section 44 and the interior surface of the aperture in baffle 52. This will closely confine and restrict the arc while exposing the same to the reservoirs of arc extinguishing liquid present in notches 45 and 56 of insulating members 44 and 52, respectively, to thereby quickly extinguish the arc.

Somewhat above the middle of casing 2 there is provided an annular supporting sleeve 58 of insulating material, the outer surface of which is threaded to engage with the threaded interior surface of the casing. Supporting sleeve 58 is provided at its upper end with an integral laterally-extending chordal segment 60 for supporting a bimetal strip 62. The bimetal strip has one end thereof secured to the outer surface of segment 60 by a clamping plate 67 secured to segment 60 as by screws 68 passing through the clamping plate and bimetal element 62, to find threaded engagement in segment 60. Screws 68 also serve to mechanically and electrically secure a conducting strip 70 to the clamping plate and upper end of bimetal strip 62. The conducting strip 70 extends from the upper end of bimetal strip 62 to the inner wall of the casing 2, and along this wall to be secured between the adjacent end of the casing and terminal cap 4.

Bimetal strip 62 is constructed in a manner well known in the art, of a pair of metallic laminations 64 and 66 suitably secured together, as by welding or the like, and which laminations are of materials having different coefficients of thermal expansion. In this instance, it is desired to have the lower end of the bimetal strip deflect to the left, as viewed in Fig. 1, and therefore lamination 66 should be of a material having a relatively high coefficient of thermal expansion, such, for example, as brass or the like, and lamination 64 should be of a material having a lower coefficient of thermal expansion, such, for example, as a steel alloy. A flexible conductor 72 is connected at one end to the upper end of contact rod 38, as by a screw 73, and has its other end connected to the lower end of the bimetal strip 62, in any desired manner, such, for example, as by soldering or the like.

The lower end of bimetal strip 62 is provided with a laterally projecting contact button 74 positioned at one side of the longitudinal center of the bimetal strip, for cooperation with one leg 76 of a generally U-shaped bracket 78. The other leg of bracket 78 is secured to insulating supporting sleeve 58, for example, as by a screw 80. Bracket 78 is connected to one end of a solenoid coil 82 by a conductor 81.

Solenoid coil 82 is supported in a hollow annular support 84 of insulating material, the outer surface of which is threaded to be threadedly engaged with the inner threaded surface of casing 2. Insulating support 84 may be of any desired insulating material preferably of a molded or plastic insulating material which may be formed about the coil 82. The other terminal of solenoid coil 82 is connected to contact supporting plate 30 by a conductor 86, secured to plate 30 as by a screw 88.

Intermediate insulating supports 58 and 84 there is provided an annular supporting member 94 of insulating material, for supporting a pair of latch members. One latch member 98 is adapted to maintain movable contact rod 38 in a position wherein the lower end thereof is in engagement with fixed contact buttons 34. Supporting sleeve 94, like the other supporting sleeves, is exteriorly threaded to be threadedly engaged with the interior threads of casing 2. Supporting sleeve 94 is provided with integral pivot supporting ears 90 for supporting a pivot pin 96 on which latch lever 98 is pivotally mounted. A coiled biasing spring 100 has an intermediate portion thereof coiled about the pivot pin 96 and has its end portions engaging with latch lever 98 and casing 2, respectively, for biasing the latch lever in a counterclockwise direction as viewed on the drawings. The outer end of latch lever 98 is turned laterally upwardly, and notched, as at 102, for latching engagement with the free end of bimetal strip 62, in the closed position of the breaker.

The electric circuit through the interrupter may now be traced from upper contact terminal pad 24 through break contact 18, break terminal tongues 12, terminal cap 4, conductor 70 to the upper end of bimetal strip 62. As shown in Fig. 1, the free end of bimetal strip 62 is maintained in a position wherein contact button 74 is out of engagement with bracket 76, so that the circuit proceeds through bimetal strip 62, flexible conductor 72, contact rod 38, contact buttons 34, contact strips 32, supporting plate 30, and terminal cap 6 to hinge contact 14 and the other line terminal pad 21.

Latch lever 98 is adapted to move through a slot 92 provided through the outer end of magnetic section 42 of the contact rod, so that, upon the passage of currents above a predetermined value through the circuit, bimetal strip 62 will deflect to the left to release latch lever 98, and spring 48 will be free to move contact rod 38 upwardly and interrupt the circuit. This upward movement of the contact rod will cause latch lever 98 to move through slot 92 to substantially the position shown in Fig. 2 of the drawings. As bimetal strip 62 cools down, it will deflect to the right, until finally contact button 74 engages leg 76 of bracket 78, to complete a circuit to the solenoid coil by way of conductors 81 and 86. Solenoid coil 82 being thus energized, a force is exerted on magnetic section 42 of the contact rod to move the rod downwardly against the bias of spring 48, until the lower end of the contact rod re-engages contacts 34 to reclose the circuit. As reclosing movement of contact rod 38 proceeds, latch lever 98 will move in a counterclockwise direction about its pivot 96 under the influence of its biasing spring 100, so that the outwardly curved end thereof will engage the lower portion of bimetal strip 62 before the limit of movement in a downward direction of the contact rod is reached, and substantially at the same time or slightly thereafter conducting section 40 of the contact rod first engages contact buttons 34. Continued movement of the parts enables latch lever 98 to exert a camming action on the bimetal strip to move the lower end thereof to the left to the position shown in Fig. 1 thereby disengaging contact button 74 from bracket 78 and interrupting the circuit to solenoid 82. This also permits the lower end of the bimetal strip to seat in notch 102 at the end of lever 98. Although engagement of rod section 40 with contact buttons 34 short circuits solenoid 82, continued movement to the locked position shown in Fig. 1 is due to the momentum of the moving parts.

If the overload on the circuit has cleared upon an automatic reclosure of the breaker contacts as described above, the contacts will remain closed until an overload appears at a later time. However, if the overload is still present on the circuit upon reclosure of the breaker contacts, the circuit will again be interrupted by deflection of the bimetal element and be subsequently reclosed, in the manner pointed out above. With the structure thus far described, the breaker would automatically continue to interrupt and reclose the circuit so long as an overload is present.

It has been found that faults not of a permanent character are usually cleared in a relatively short time, so that approximately 90% of self-clearing faults will be cleared by the second successive reclosure of the circuit. It is desirable, therefore, to limit the number of reclosures to two or three, and, if the fault has not cleared after a predetermined number of reclosing operations, to open the circuit in a manner to require the attention of a maintenance employe in order to effect reclosure of the circuit. For this purpose a pry-out lever 104 substantially triangular in form is pivotally mounted on terminal cap 4 as at 106. Pry-out lever 104 is provided with an integral hook-shaped portion 108 adapted normally to be positioned beside hook eye 5 so as to be maintained in this position by a hook stick when the hook stick is positioned in hook eye 5. An actuating rod 110 for the pry-out lever is slidably mounted in an aperture provided in terminal cap 4, and is provided with a head 112 at its upper end for engagement with the pry-out lever. Actuating rod 110 is slidably mounted in a sleeve 114 of insulating material, which is threaded into the aperture in terminal cap 4. Within sleeve 114 there is provided a coiled tension spring 116, one end of which is secured to the actuating rod and the other end of which is anchored to a bearing collar 118 threaded or otherwise secured in the upper end of sleeve 114. Actuating rod 110 is normally maintained within casing 2, with spring 116 in an extended condition, by a latch lever 120 pivoted on the same pivot 96 as latch lever 98. Latch lever 120 is provided with a nose 122 adapted to engage over the laterally extending inner end 124 of rod 110, to maintain the actuating rod retracted. A second spring 125 is coiled about pivot 96 and has the opposite ends thereof engaged with latch lever 120 and solenoid support 84 in a manner to bias latch lever 120 in a clockwise direction about pivot 96, into latching engagement with actuating rod 110. An angular release lever 126 is pivoted as at 128 on latch lever 120 adjacent the upper end thereof, for a purpose to be described.

A dashpot cylinder 130 is supported on solenoid support 84, and has a piston 132 therein having a piston rod projecting from the upper end of cylinder 136 formed as a ratchet 134. Dashpot cylinder 130 has a restricted opening 136 through the lower end thereof for controlling the rate of movement of ratchet 134.

Now upon a circuit interrupting operation of the structure described above, it will be observed that as contact rod 38 moves upwardly, pawl 36 will fall from notch 35 when the upper free end of the pawl clears guide 133 mounted on the upper end of dashpot cylinder 130. If desired, a spring may be used to assist in moving pawl 36 from notch 35 to the position shown in Fig. 2. This permits the pawl to engage the upper notch of ratchet 134, to move the dashpot piston a predetermined distance upwardly. It will be observed that section 40 of the contact rod is provided with a stop pin 135 extending transversely therethrough for engagement with the lower end of solenoid support 84 to establish the upper limit of movement of the contact rod, and thereby predetermine the amount dashpot piston 132 will be moved upwardly. Following such an initial circuit interrupting operation, the breaker contacts will be reclosed in the manner previously described. During downward movement of contact rod 38, pawl 36 will be cammed out of engagement with the notch on ratchet 134 back into notch 35 as shown in Fig. 1. Now, if the fault has cleared, dashpot piston 132 will slowly return to its normal position shown in Fig. 1 so that upon a subsequent circuit interrupting operation the upper notch of ratchet 134 will again be engaged by pawl 36. However, if upon the first reclosure of the breaker contacts the fault is still present, the contacts will be immediately separated again, and this time pawl 36 will engage the second notch of ratchet 134, because the dashpot piston has not had time to return to its original position. Accordingly, this time the dashpot piston will be elevated a further amount. After the circuit has been interrupted the second time, the breaker contacts will again be reclosed, and if the fault has cleared dashpot piston 132 will eventually return to its original position. However, if the fault still remains on the circuit upon the second successive reclosure of the breaker contacts, a third circuit interrupting operation will immediately occur, and this time pawl 36 will engage the lowest notch of ratchet 134 and move it and dashpot piston 132 to the extreme upper position shown in Fig. 2 of the drawings. This movement of ratchet 134 causes it to engage one leg of release lever 126, to move the lever in a clockwise direction about its pivot 128, and since the other leg of this lever engages supporting sleeve 58, pivotal movement of the lever will cause latch lever 120 to move to the left as shown in Fig. 1 to the position shown in Fig. 2 and release actuating rod 110. Upon the release of actuating rod 110, it is moved rapidly upwardly by spring 116, and causes counterclockwise rotation of pry-out lever 104 on its pivot 106. Since the nose 105 of the pry-out lever will engage terminal pad 24 during such movement of the pry-out lever, it will cause its pivot point 106 to move to the right to the position shown in Fig. 2 by the time actuating rod 110 reaches the end of its stroke. At this position of the parts the circuit breaker has acquired kinetic energy and is free of frictional engagement with break contact 18, so that movement thereof in a clockwise direction on its trunnions 10 will continue, assisted by the force of gravity, until the interrupter reaches a position at which it depends from hinge contact 14.

Thus, after a predetermined number of successive circuit interrupting operations, pry-out lever 104 is actuated to pry the interrupter out of line contact 18 and cause it to move to a position wherein a relatively large air gap is inserted in the circuit. This operation takes place automatically, only in response to a predetermined number of closely successive circuit interrupting operations, because, as pointed out above, if the interrupting operations are not successive dashpot piston 132 will reset, so that the interrupter will be prepared to drop out of the circuit only in response to the same predetermined number of closely successive circuit interrupting operations when a fault again appears on a circuit at a later time.

When it is desired to reclose the circuit after the breaker has dropped out in the manner pointed out above, a hook stick may be inserted in hook eye 5, and pry-out lever 104 rotated in a clockwise direction from its position shown in Fig. 2, to bring its hook 108 along side hook eye 105, so that the projection on the hook stick may engage hook 108 to hold pry-out lever 104 in the position shown in Fig. 1. Thereupon, the breaker may be rotated into engagement with break contact 18 as previously described. As soon as terminal tongues 12 engage break contact 18, a circuit will be established to reclose the breaker contacts through solenoid 82. This will withdraw pawl lever 36 from ratchet 134 and permit the dashpot piston to reset itself. As soon as the dashpot piston recedes from the position shown in Fig. 2, latch lever 120 will be moved back into latching engagement with the lower end of actuating rod 110 by its biasing spring 125. Thereupon the hook stick may be removed from hook eye 5 and the breaker will automatically attain the normal condition shown in Fig. 1.

The circuit breaker shown in Fig. 5 is similar in many respects to that shown in Figs. 1, 2 and 3, and accordingly like reference characters will be used to designate like parts. This embodiment of the invention differs from that previously described in that the latch lever 139 for holding actuating rod 110 retracted is preferably of an insulating material, and has terminal screw or rivet 140 at the upper end thereof, and is biased in a counterclockwise direction to disengage angular extension 124 on the actuating rod by a biasing spring 139, coiled about pivot 96 and reacting between lever 138 and the top wall of solenoid support 84. The dashpot is dispensed with in this embodiment of the invention, and its place taken by fusible element 142 connected between terminal 140 on latch lever 138 and a stud 143 of conducting material, secured on the top edge of supporting sleeve 58. Fusible element 142 is paralleled by a strain wire 144 to relieve the fusible element of the strain of lever biasing spring 139, and thereby to prevent lever 138 from releasing actuating rod 110. The fusible element and strain wire are preferably enclosed in a sleeve 146 of insulating material, for a purpose to be described. The circuit through the interrupter shown in Fig. 5 extends from terminal cap 4 by way of conductor 70 through bimetal strip 62, flexible conductor 72 to movable contact rod 38, as in the previously described embodiment of the invention. However the circuit to solenoid coil 82, when bimetal element contact 74 engages bracket 78, extends from bracket 78 through a conductor 148 to fusible element 142 and then by a conductor 150 to the solenoid coil.

With the structure described above, fusible element 142 will carry current only during the relatively short time when solenoid 82 is energized and the circuit is being reclosed. Fusible element 142 is constructed so as to have low heat dissipating characteristics and sleeve 146 prevents dissipation of heat from the fusible element. Accordingly, on a first reclosure of the circuit breaker contacts, fusible element 142 will be heated at predetermined amount, and if a second reclosure immediately succeeds the first, fusible element 142 will not as yet have lost all of the heat generated therein on the first reclosure and therefore will be heated to a higher temperature. Similarly, if a third reclosure immediately succeeds the second, fusible element 142 will be heated to a still higher temperature such that if the interrupter attempts to reclose a fourth time the fuse will be heated to a temperature high enough to melt fusible element 142 and strain wire 144, to thereby interrupt the solenoid circuit so that it will be ineffective to reclose the interrupter contacts. At the same time, latch lever 138 is released and its biasing spring 139 moves it to the left, as viewed in Fig. 5, to release actuating rod 110. Of course, if the fault clears before fuse element 142 melts, the heat generated in the fusible element by one or more reclosing operations will eventually be dissipated, so that actuating rod 110 will be released only in response to the same predetermined number of closely successive circuit interrupting operations, in the event a fault appears upon the circuit at some later time.

When the fusible element 142 melts, the breaker contacts will remain open and it will be necessary to replace the fusible element to again put the breaker into service. Replacement of the fusible element may be quickly and easily made by removing terminal cap 4 and connecting a new fusible element between stud 143 and lever 138.

The upper line contact structure shown in Fig. 5 comprises a generally vertically arranged housing 152 which is open at the bottom and is secured to line terminal pad 24, for example, as by screws 153. The front wall of housing 152 is spaced from terminal pad 24 and is provided with a notch 154 adjacent the lower end thereof for receiving the inner end of a contact latch 156, pivoted in the housing on a pivot pin 158. Contact latch 156 is adapted to seat on the upper terminal cap 4 of the breaker, and is provided with a nose 160 engageable over the edge of terminal cap 4 to retain the breaker in circuit. A toggle spring 162 is tensioned between a fixed pin 164 mounted in housing 152 adjacent the upper end thereof, and a pin 166 provided on latch lever 156. It will be observed that in the position of the parts shown in Fig. 5, toggle spring 162 acts to the left of latch pivot 158 and consequently biases the contact latch in a clockwise direction about pivot 158, into pressure engagement with upper terminal cap 4 of the breaker. When actuating rod 110 is released and moved upwardly by spring 116, the latch 156 will also be moved upwardly and the end of spring 162 supported on latch pin 166 will be moved over the center of pivot 158, to cause the latch lever to fly up to the dotted-line position shown in Fig. 5 and be retained at this position by toggle spring 162. Moreover, it will be observed that in the movement of contact latch 156 from the full to the dotted-line position shown in Fig. 5, extension 167 on the latch will engage the side of terminal cap 4 opposite hook eye 5, to positively move the interrupter to the right and initiate its drop-out movement.

Moreover, after the interrupter has been reconditioned by replacement of the fusible element, a hook stick may be inserted in hook eye 5 to move the interrupter in a counterclockwise direction back toward insulator 28. During this movement terminal cap 4 will engage projection 167 on the latch lever to cause clockwise rotation of the latch lever about its pivot 158, to move the lower end of toggle spring 162 over center and cause the latch lever 156 to be moved with a quick snap-action back to the position shown in full lines in Fig. 5, wherein it is in latching engagement with upper terminal cap 4. A flexible shunt 168 is preferably connected between terminal pad 24 and contact latch 156 in order to provide a good electrical connection between these parts.

The contact latch mechanism shown in Fig. 6 of the drawings is quite similar to that illustrated in Fig. 5 except that the toggle spring is arranged generally horizontally instead of vertically, as shown in Fig. 5. In this embodiment of the invention a sleet hood 170 is arranged horizontally, being mounted on terminal pad 24 as by screws 171. A contact latch 172 is provided on the upper side thereof with a pair of spaced parallel flanges 174 (only one of which is shown). Latch 172 is pivoted on a pin 176 supported from the sides of the sleet hood and extending through flanges 174, for movement of the latch into and out of engagement with the upper terminal cap 4 of a circuit breaker similar to those previously described. The outer end of latch 172 is provided with a nose 173 for holding the breaker in circuit, and at its inner end it is provided with an angular extension 175 for engagement with the side of terminal cap 4 opposite hook eye 5. A toggle tension spring 178 is supported at one end by an eye 180 integral with terminal pad 24, and engages at its other end with a pin 182 fixed with respect to flanges 174 of latch lever 172.

In the closed circuit position of the parts shown in Fig. 6, it will be observed that the line of action of toggle spring 178 lies below latch pivot 176, so that the spring biases the latch lever in a clockwise direction into pressure engagement with terminal cap 4 of the breaker. A flexible shunt 184 connects the latch lever and terminal pad 24, to provide a good electrical connection between these parts. When latch lever 172 is moved upwardly or in a counterclockwise direction about its pivot 176, for example, as by an actuating rod 110 operable in response to a predetermined number of closely successive circuit interrupter operations of the breaker, the line of action of the toggle spring 178 will be moved above latch pin 176 to assist in rapidly moving the latch lever to a position where it engages the top wall of sleet hood 170. During this movement of the latch, extension 175 thereof will cause movement of the breaker casing 2 in a clockwise direction away from insulator 28, to give an initial impetus to the drop-out movement of the breaker. Latch lever 172 is reset into engagement with upper terminal cap 4 of the breaker, merely by moving the breaker back towards insulator 28 because during such movement the upper terminal cap 4 will engage extension 175 of the latch, and move the latch in a clockwise direction back into pressure engagement with the upper terminal cap of the breaker.

The specific structures described above, as exemplifying preferred embodiments of this invention, clearly provide automatic reclosing circuit breaker constructions which are operable in response to a predetermined number of closely succeeding circuit interrupting operations of the breaker, to cause the breaker to drop out of the circuit and insert a relatively large visible air gap. Moreover, this drop-out movement of the breaker may occur merely in response to a predetermined number of closely successive circuit interrupting operations, or it may occur in response to operation of means within the breaker for preventing reclosing of the breaker contacts. Furthermore, there has been disclosed herein various forms of contact structures for a circuit interrupter of the drop-out type, including a frictional contact structure with means for prying the contacts apart, and line contact structures in the form of toggle latch members operable to positively initiate drop-out movement of the interrupter, and capable of being reset merely by moving the interrupter back into the circuit.

The interrupter constituting this invention is designed to be operated with the casing 2 substantially entirely filled with an arc extinguishing liquid, such, for example, as an insulating oil, with at least the bimetal strip 62 submerged in the closed circuit position of the parts.

Having described preferred embodiments of the invention in accordance with the Patent Statutes, it is desired that the invention be not limited to the particular structures disclosed herein inasmuch as it will be obvious, particularly to persons skilled in the art, that many changes and modifications may be made in these particular structures without departing from the broad spirit and scope of this invention.

I claim as my invention:

1. In a circuit interrupter, spaced line terminals, a circuit breaker having spaced terminals thereon, said breaker having separable contacts connected between the terminals thereof, means responsive to currents above a predetermined value for separating said contacts, and means responsive to a circuit interrupting operation for automatically reclosing said contacts; means supporting said breaker for movement of at least one terminal thereof into and out of engagement with one of said line terminals, a movable member operable to cause movement of said breaker in a direction to disengage said one breaker and line terminals to insert an air gap in the circuit, and means responsive only to a predetermined number of closely successive circuit interrupting operations by said breaker contacts for operating said movable member.

2. In a circuit interrupter, spaced line terminals, a circuit breaker having spaced terminals thereon, said breaker having separable contacts connected between the terminals thereof, means responsive to currents above a predetermined value for separating said contacts, and means responsive to a circuit interrupting operation for automatically reclosing said contacts; means supporting said breaker for movement of at least one terminal thereof toward and away from one of said line terminals, releasable means normally holding said one breaker terminal in engagement with said one line terminal, and means responsive only to a predetermined number of closely successive circuit interrupting operations by said breaker contacts to release said releasable means to thereby release said breaker from said one line terminal and permit movement thereof in a direction to disengage said one breaker and line terminals and insert an air gap in the circuit.

3. In a circuit interrupter, spaced line terminals, a circuit breaker having spaced terminals thereon, said breaker having separable contacts connected between the terminal thereof, means responsive to currents above a predetermined value for separating said contacts, and means responsive to a circuit interrupting operation for automatically reclosing said contacts; means supporting said breaker for movement of at least one terminal thereof into and out of engagement with one of said line terminals, said one breaker and line terminals comprising blade and jaw members, respectively, a member movably associated with said breaker and line terminal, and means responsive only to a predetermined number of closely successive circuit interrupting operations to move said movable member in a direction to cause movement of said one breaker terminal away from its line terminal and insert an air gap in the circuit.

4. In a circuit interrupter, spaced line terminals, a circuit breaker having spaced terminals thereon, said breaker having separable contacts connected between the terminals thereof, means responsive to currents above a predetermined value for separating said contacts, and means responsive to a circuit interrupting operation for automatically reclosing said contacts; means supporting said breaker for movement of at least one terminal thereof into and out of engagement with one of said line terminals, said one line terminal including movable latch means normally holding said terminals in engagement, and means responsive only to a predetermined number of closely successive circuit interrupting operations by said breaker contacts to release said latch means and permit movement of said breaker in a direction to disengage said one breaker and line terminals and insert an air gap in the circuit.

5. In a circuit interrupter, spaced line terminals, a circuit breaker having spaced terminals thereon, said breaker having separable contacts connected between the terminals thereof, means responsive to currents above a predetermined value for separating said contacts, and means responsive to a circuit interrupting operation for automatically reclosing said contacts; means supporting said breaker for movement of at least one terminal thereof into and out of engagement with one of said line terminals, said one breaker and line terminal comprising blade and jaw members, respectively, a lever movably mounted on one of said terminals and operable to engage the other, and means responsive only to a predetermined number of closely successive circuit interrupting operations by said breaker contacts to operate said lever to pry said blade and jaw members apart and permit movement of said breaker in a direction to disengage said one breaker and line terminals and insert an air gap in the circuit.

6. In a circuit interrupter, spaced line terminals, a circuit breaker having spaced terminals thereon, said breaker having separable contacts connected between the terminals thereof, means responsive to currents above a predetermined value for separating said contacts, and means responsive to a circuit interrupting operation for automatically reclosing said contacts; means supporting said breaker for movement of at least one terminal thereof into and out of engagement with one of said line terminals, said one line terminal comprising a pivoted latch member adapted to engage said one breaker terminal in one position, an overcenter spring adapted to maintain said latch member at said one position and at a position out of engagement with said one breaker terminal, and means responsive only to a predetermined number of closely successive circuit interrupting operations by said breaker contacts to move said latch from said one position at least enough to move said spring overcenter to release said breaker and permit movement thereof in a direction to disengage said one breaker and line terminals and insert an air gap in the circuit.

7. In a circuit interrupter, spaced line terminals, a circuit breaker having spaced terminals thereon, said breaker having separable contacts connected between the terminals thereof, means responsive to currents above a predetermined value for separating said contacts, means responsive to a circuit interrupting operation for automatically reclosing said contacts, and means responsive to a predetermined number of closely successive circuit interrupting operations by said contacts to prevent reclosure of said contacts; means supporting said breaker for movement of at least one terminal thereof into and out of engagement with one of said line terminals, and means actuated by said reclosure preventing means upon operation of the latter to cause movement of said breaker in a direction to disengage said one breaker and line terminals and insert an air gap in the circuit.

8. In a circuit interrupter, a line terminal, means automatically operative to interrupt the circuit in response to currents above a predetermined value, said interrupting means having a terminal, means mounting said interrupting means for movement of its terminal into and out of engagement with said line terminal, said line terminal including a pivoted latch means adapted to engage said interrupting means to normally maintain said terminals in engagement, a spring adapted to be moved overcenter by movement of said latch, said spring being capable of biasing said latch into engagement with said interrupter and also capable of maintaining said latch at a released position when moved overcenter, means responsive to a circuit interrupting operation of said interrupting means to move said latch toward said released position at least sufficiently to move said spring overcenter, and said latch having a part movable therewith during releasing movement to engage said interrupter and cause movement thereof in a direction away from said line terminal.

9. In a circuit interrupter, a line terminal, means automatically operative to interrupt the circuit in response to currents above a predetermined value, said interrupting means having a terminal, means mounting said interrupting means for movement of its terminal into and out of engagement with said line terminal, said line terminal including a pivoted latch means adapted to engage said interrupting means to normally maintain said terminals in engagement, a spring adapted to be moved overcenter by movement of said latch, said spring being capable of biasing said latch into engagement with said interrupter and also capable of maintaining said latch at a released position when moved overcenter, means responsive to a circuit interrupting operation of said interrupting means to move said latch toward said released position at least sufficiently to move said spring overcenter, said latch having a part movable therewith during releasing movement to engage said interrupter and cause movement thereof in a direction away from said line terminal, and said latch part at said released latch position being in the path of movement of said interrupter so that upon movement of said interrupter toward said line terminal, said latch will be moved an amount at least sufficient to move said spring overcenter to automatically latch said terminals in engagement.

10. In an automatic reclosing circuit breaker, a breaker casing having terminals thereon, separable breaker contacts in said casing together with means for sepaarting said contacts in response to predetermined electrical conditions to interrupt the circuit between said terminals and means for automatically reclosing said contacts after a circuit interrupting operation, separable disconnect contacts outside of said casing, means in said casing responsive only to a predetermined number of closely successive circuit interrupting operations for separating said disconnecting contacts, and motion transmitting means extending through a wall of said casing for actuating said disconnect contacts.

11. In an automatic reclosing circuit breaker, a breaker casing having terminals thereon, separable breaker contacts in said casing together with means for separating said contacts in response to predetermined electrical conditions to interrupt the circuit between said terminals and means for automatically reclosing said contacts after a circuit interrupting operation, separable disconnect contacts outside of said casing, spring means normally held in stressed condition for separating said disconnect contacts when released, means in said casing responsive only to a predetermined number of closely successive circuit interrupting operations for releasing said spring means to cause separation of said disconnect contacts, and means extending from said operation responsive means through a wall of said casing to said disconnect contacts effecting release of the latter by the operation responsive means.

12. A circuit interrupter comprising, spaced line terminals, a circuit breaking device having spaced terminals thereon and adapted to bridge said line terminals, means supporting said entire device for movement so that at least one of its terminals is movable with said device into and out of engagement with one of said line terminals, means normally holding said device at closed circuit position where its one terminal is in engagement with said one line terminal, and means entirely carried by said device responsive only to a predetermined number of closely successive occurrences of overload on the circuit greater than a predetermined value to release said holding means and permit movement of said device and its one terminal in a direction to disengage said one terminal from said one line terminal and thereby open the circuit.

13. A circuit interrupter comprising, spaced line terminals, a circuit breaking device having spaced terminals thereon and adapted to bridge said line terminals, means supporting said entire device for movement so that at least one of its terminals is movable with said device into and out of engagement with one of said line terminals, and said device constituting the sole support for a means responsive only to a predetermined number of closely successive occurrences of overload on the circuit greater than a predetermined value to cause movement of said device and its one terminal in a direction to disengage said one terminal from said one line terminal and thereby open the circuit.

ARTHUR T. STRATTON.

REFERENCES CITED

The following references are of record in the file of this patent:

UNITED STATES PATENTS

| Number | Name | Date |
|---|---|---|
| 844,791 | Geisenhoner | Feb. 19, 1907 |
| 975,419 | Harris | Nov. 15, 1910 |
| 1,199,451 | Christman | Sept. 26, 1916 |
| 1,940,203 | Bowie | Dec. 19, 1933 |
| 1,982,986 | Garlington | Dec. 4, 1934 |
| 2,104,933 | Schultz | Jan. 11, 1938 |
| 2,230,955 | Johnson | Feb. 4, 1941 |
| 2,303,953 | Rawlins et al. | Dec. 1, 1942 |
| 2,333,774 | Fahnoe | Nov. 9, 1943 |
| 2,349,609 | Brown et al. | May 23, 1944 |
| 2,387,372 | Watkins et al. | Oct. 23, 1945 |
| 2,523,984 | Edwards | Sept. 26, 1950 |
| 2,528,118 | Crabbs | Oct. 31, 1950 |